(12) United States Patent
Jinno et al.

(10) Patent No.: US 6,705,618 B2
(45) Date of Patent: Mar. 16, 2004

(54) CYLINDER HEAD GASKET

(75) Inventors: Osamu Jinno, Toyota (JP); Eisaburo Goto, Toyota (JP); Seiji Omura, Toyota (JP); Tatsuya Kawakita, Toyota (JP); Hideo Nakamura, Toyota (JP)

(73) Assignees: Taiho Kogyo Co., Ltd., Aichi (JP); Toyota Jidosha Kabushiki Kaisha, Aichi (JP)

(*) Notice: Subject to any disclaimer, the term of this patent is extended or adjusted under 35 U.S.C. 154(b) by 0 days.

(21) Appl. No.: 09/963,309

(22) Filed: Sep. 26, 2001

(65) Prior Publication Data

US 2002/0011709 A1 Jan. 31, 2002

Related U.S. Application Data

(63) Continuation of application No. 09/374,867, filed on Aug. 16, 1999, now Pat. No. 6,328,314.

(30) Foreign Application Priority Data

Sep. 18, 1998 (JP) .......................... 10-264263

(51) Int. Cl.⁷ ................................. F02F 11/00
(52) U.S. Cl. .................. 277/593; 277/594; 277/595
(58) Field of Search ................ 277/593, 594, 277/595, 592

(56) References Cited

U.S. PATENT DOCUMENTS

| | | | | |
|---|---|---|---|---|
| 4,428,593 A | * | 1/1984 | Pearlstein | 277/596 |
| 4,721,315 A | * | 1/1988 | Ueta | 277/593 |
| 5,205,566 A | * | 4/1993 | Ueta et al. | 277/596 |
| 5,230,521 A | * | 7/1993 | Ueta | 277/595 |
| 5,232,229 A | * | 8/1993 | Udagawa | 277/595 |
| 5,269,541 A | * | 12/1993 | Inamura | 277/595 |
| 5,360,219 A | * | 11/1994 | Okuda et al. | 277/592 |
| 5,601,292 A | * | 2/1997 | Tanaka et al. | 277/593 |
| 5,609,345 A | * | 3/1997 | Miura et al. | 277/593 |
| 5,664,790 A | * | 9/1997 | Tanaka et al. | 277/595 |
| 5,863,046 A | * | 1/1999 | Diez et al. | 277/593 |
| 5,876,038 A | * | 3/1999 | Bohm et al. | 277/593 |
| 5,906,376 A | * | 5/1999 | Udagawa et al. | 277/593 |
| 5,979,906 A | * | 11/1999 | Silvian | 277/593 |
| 6,145,847 A | * | 11/2000 | Maeda et al. | 277/593 |
| 6,328,314 B1 | * | 12/2001 | Jinno et al. | 277/593 |

FOREIGN PATENT DOCUMENTS

| | | |
|---|---|---|
| JP | 62-155375 | 7/1987 |
| JP | 63-293363 | 11/1988 |
| JP | 64-073157 | 3/1989 |
| JP | 1-118149 U | 8/1989 |
| JP | 2-061171 U | 5/1990 |
| JP | 4-307178 | 10/1992 |
| JP | 5-010448 | 1/1993 |
| JP | 5-118443 | 5/1993 |

* cited by examiner

Primary Examiner—Anthony Knight
Assistant Examiner—Alison K. Pickard
(74) Attorney, Agent, or Firm—Flynn, Thiel, Boutell & Tanis, P.C.

(57) ABSTRACT

A cylinder head gasket includes a pair of first and second gasket substrates. The gasket substrates are each formed with a first and a second projection which project in opposite directions, with a clearance therebetween. According to a first aspect of the invention, each projection undergoes a plastic deformation toward the clearance defined between them when the gasket substrates are held sandwiched between a cylinder head and a cylinder block, each projection undergoing a magnitude of plastic deformation which is greater or lesser in accordance with the magnitude of a surface pressure therebetween. According to a second aspect of the invention, each projection is formed with a radially central part which projects toward the radially central part of the other projection and which is in close contact with each other continuously in the circumferential direction.

20 Claims, 6 Drawing Sheets

CYLINDER HEAD GASKET

This is a continuation of application Ser. No. 09/374,867, filed Aug. 16, 1999, now U.S. Pat. No. 6,328,314 granted Dec. 11, 2001.

FIELD OF THE INVENTION

The present invention relates to a cylinder head, gasket used in an engine.

DESCRIPTION OF THE PRIOR ART

A cylinder head gasket is known in the art which comprises a first and a second gasket plate disposed in overlapping relationship, held sandwiched between a cylinder head and a cylinder block and-each having a combustion chamber opening formed therein in alignment with a cylinder bore.

In a cylinder head gasket of the type described, as an explosion pressure of an engine increases, a gas in a combustion chamber may blow through a clearance between the cylinder head gasket and the cylinder head, between the cylinder head gasket and the cylinder block or between a first and a second gasket substrate which form together the cylinder head gasket.

For purposes of reducing the weight of an engine, a cylinder block which is made from aluminum has recently been employed, with a cast iron liner being usually provided on the cylinder bore in order to secure an abrasion resistance thereof. Such a liner may be secured in place by a press fit or by a casting technique. In the press fit technique, the end of the liner is formed with a flange, which is disposed in abutment against an offset step formed on the block, so that the both parts may be positioned and the&liner can be secured by a press fit in the cylinder block.

For a multi-cylinder engine including a plurality of press fit liners, if each liner is mounted on the cylinder block in an even manner, there often results a delicate difference in the amount of projection above the surface of the cylinder block from liner to liner.

Accordingly, when the cylinder head gasket is interposed between the cylinder head and the cylinder block, which are then clamped together by clamping bolts, a failure of a bead on the cylinder head gasket may occur in a region thereof which is contacted by a liner which projects above the surface of the cylinder block to cause an excessively high pressure of contact or the offset step on the cylinder block, which is abutted by the liner flange, may be deformed to cause a blow-through of a gas in the combustion chamber. The likelihood of causing a blow-through of a gas in the combustion chamber also exists in a region of the cylinder head gasket which is contacted by a liner which remains depressed below the surface of the cylinder block to present an excessively low pressure of contact.

When the cylinder head and the cylinder block are clamped together by the clamping bolts, the surface pressure is high in a region located adjacent to one of the bolts while the surface pressure decreases with a distance from the bolts, causing a degradation in the sealing performance of some engines at a distance from the clamping bolts, again giving rise to the likelihood of producing a blow-through of a gas in the combustion chamber.

SUMMARY OF THE INVENTION

The present invention provides a cylinder head gasket capable of preventing the occurrence of a blow-through of a combustion gas more effectively.

The invention also provides a cylinder head gasket which allows the occurrence of a blow-through of a combustion gas to be prevented by enabling a surface pressure which is as even as possible to be achieved when a cylinder head and a cylinder block are clamped together by clamping bolts.

Specifically, according to a first aspect of the invention, there is provided a cylinder head gasket including a first and a second gasket substrate disposed in overlapping relationship, held sandwiched between a cylinder head and a cylinder block and each having a combustion chamber opening formed therein in alignment with a cylinder bore, the first gasket substrate being disposed toward the cylinder head and formed with a first inner projection surrounding the combustion chamber opening and projecting toward the cylinder head and the second gasket substrate being disposed toward the cylinder block and formed with a second inner projection surrounding the combustion chamber opening and projecting toward the cylinder block, the first and the second gasket substrate being disposed in overlapping relationship to define a clearance between the first and the second inner projection which project in opposite direction from each other, the first and the second gasket substrate being held sandwiched between the cylinder head and the cylinder block in a manner to cause a plastic deformation of the first and the second inner projection toward the clearance defined therebetween.

According to a second aspect of the invention, a cylinder head gasket of a conventional type as mentioned above is characterized in that the first gasket substrate which is disposed toward the cylinder head is formed with a first inner projection surrounding the combustion chamber opening and projecting toward the cylinder head and including a radially central part which projects toward the cylinder block, that the second gasket substrate which is disposed toward the cylinder block is formed with a second inner projection surrounding the combustion chamber opening and projecting toward the cylinder block and including a radially central part which projects toward the cylinder head, and that the first and the second gasket substrate are disposed in overlapping relationship such that at least when they are assembled into an engine, the radially central part the first inner projection and the radially central part of the second inner projection are disposed to be in close contact with each other continuously in the circumferential direction.

Accordingly, according to the first aspect of the invention, when the cylinder head gasket is held sandwiched between the cylinder head and the cylinder block, which are clamped together by clamping bolts, the first inner projection of the first gasket substrate and the second inner projection of the second gasket substrate undergo a plastic deformation in a direction toward the clearance defined therebetween.

If there is a delicate difference in the amount of projection above the surface pressure of the cylinder block from liner to liner, or if the surface pressure is high in a region adjacent to clamping bolts while it is low away therefrom, both inner projections will undergo a magnitude of a plastic deformation which varies in accordance with the surface pressure, with a consequence that there is secured an even pressure of contact, enabling a local blow-through to be prevented.

According to the second aspect of the invention, the radially central part of the first inner projection which projects toward the cylinder block and the radially, central part of the second inner projection which projects toward the cylinder head are disposed to be in close contact with each other, continuously in the circumferential direction, and accordingly, the pressure of any combustion gas which tends to blow through a clearance therebetween urges the first inner projection toward the cylinder head and urges the second inner projection toward the cylinder block. As the first inner projection is urged against the cylinder head by the gas pressure, the sealing performance thereof is improved. Similarly, as the second inner projection is urged against the cylinder block by the gas pressure, the sealing performance thereof is improved. In addition, when the first inner projection is urged against the cylinder head and the second inner projection is urged against the cylinder block, reactions from these urging effects drive the radially central parts of the first and the second inner projection into more tight contact with each other, thus improving the sealing performance in such area.

Above and other objects, features and advantages of the invention will, become apparent from the following description of several embodiments thereof with reference to the drawings.

DETAIL DESCRIPTION OF THE EMBODIMENTS

Embodiments in which the present invention is applied to a cylinder head gasket for a four cylinder tandem engine will be described.

Figure 1:
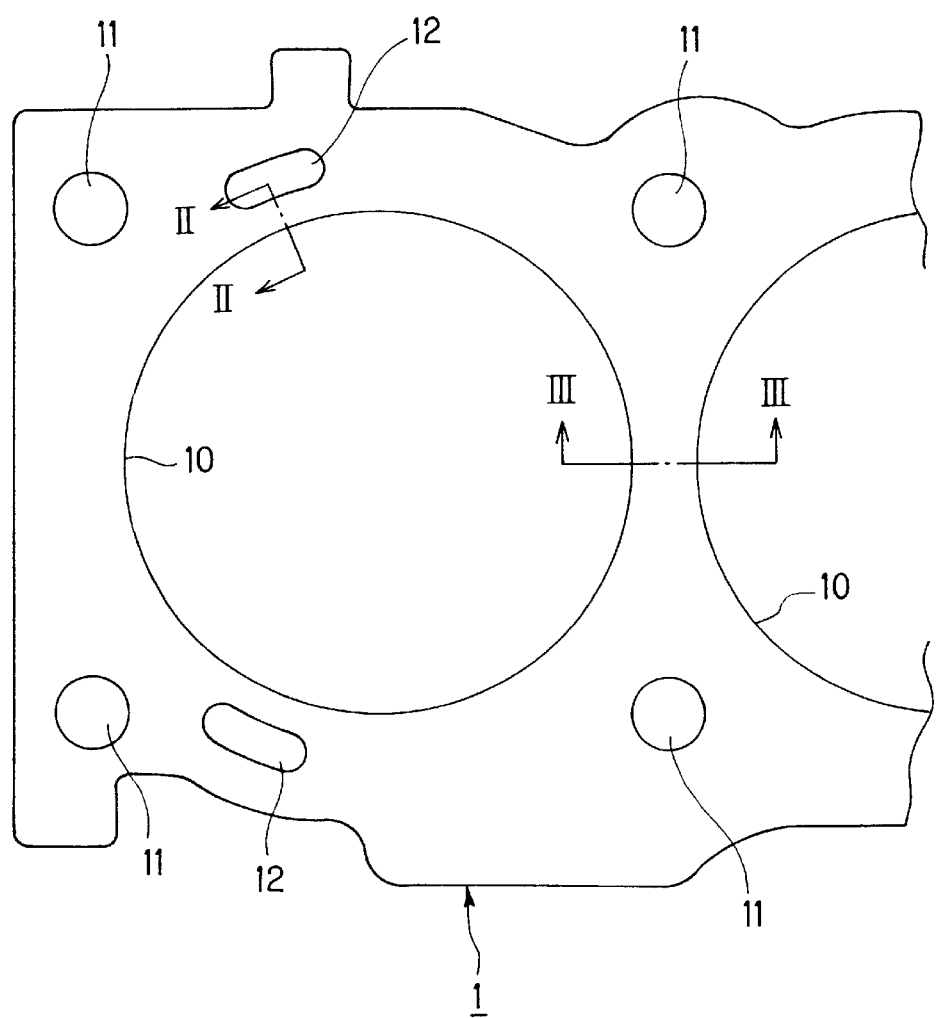
FIG. 1 is a plan view of a first embodiment of the invention.
Figure 2:
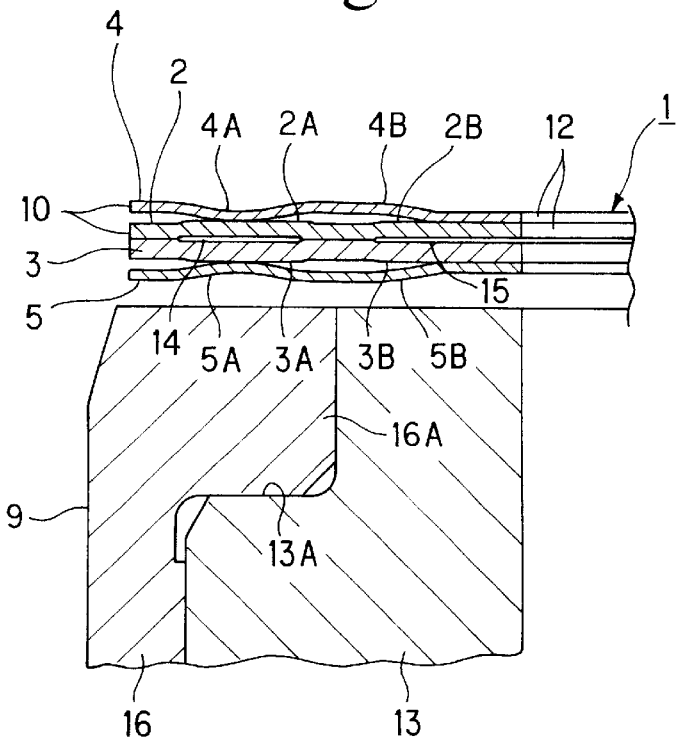
FIG. 2 is a cross section taken along the line II—II shown in FIG. 1.
Figure 3:
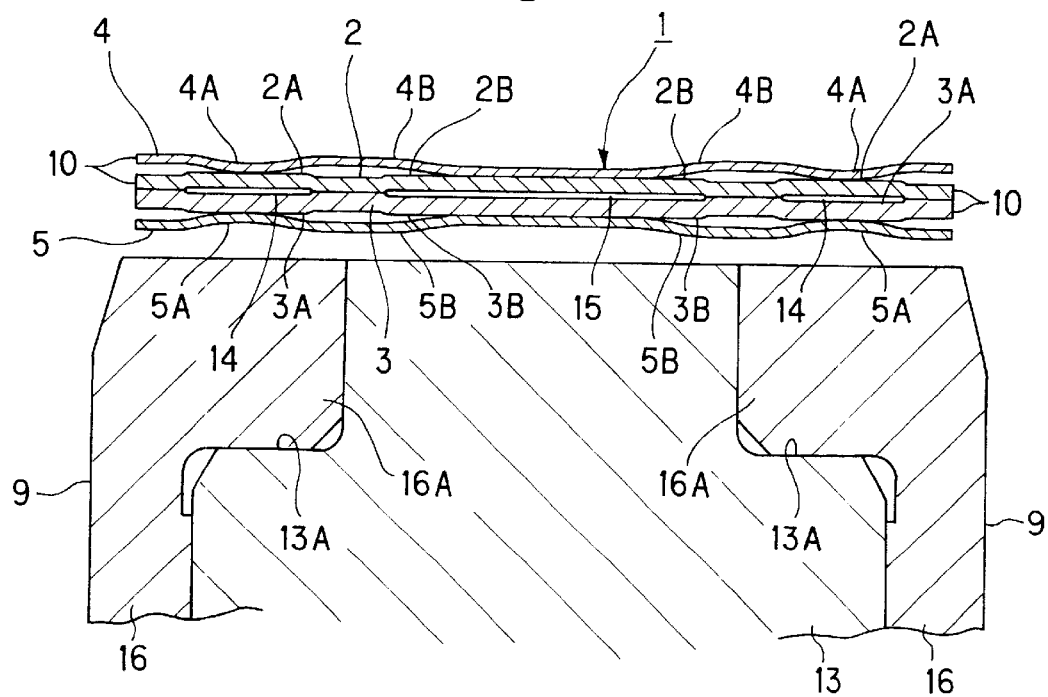
FIG. 3 is a cross section taken along the line III—III shown in FIG. 1.

Referring to FIGS. 1 to 3, a cylinder head gaskets 1 comprises a first gasket substrate 2 and a second gasket substrate 3 of a relatively increased thickness which are disposed in overlapping relationship. A first plate 4 and a second plate 5 of a relatively reduced thickness are disposed in overlapping relationship with the front and the back surface of the assembly of gasket substrates. As shown in FIG. 1, four combustion chamber openings 10 are formed through the gasket substrates 2, 3 and the plates 4, 5 in alignment with a cylinder bore 9 of an engine as are bolt holes 11 for passing clamping bolts, not shown, and water holes 12 through which a cooling water is passed. The gasket substrates 2, 3 and the plates 4, 5 are integrally, fastened together by means such as lancelock.

As is well known in the art, the cylinder head gasket 1 is interposed between a cylinder head (not shown), and a cylinder block 13 of an engine, which are integrally fastened together by clamping bolts mentioned above, whereby the gasket 1 is held sandwiched therebetween to provide a seal therebetween.

The upper or the first gasket substrate 2, which is disposed toward a cylinder head, not shown, is formed with a first inner projection 2A surrounding the combustion chamber opening 10 and projecting toward the cylinder head while the lower or the second gasket substrate 3, which is disposed toward the cylinder block 13, is formed with a second inner projection 3A surrounding the combustion chamber opening 10 and projecting toward the cylinder block 13.

The first and the second inner projection 2A, 3A are formed symmetrically to each other with respect to a mating surface between the substrates 2, 3, and when both gasket substrates 2, 3 are disposed in an overlapping relationship, a clearance or an air gap 14 (see FIG. 4) is defined between the first and the second inner projections 2A, 3A which project in opposite directions.

In addition, the first gasket substrate 3 is formed with a first outer projection 2B surrounding the first inner projection 2A and projecting toward the cylinder head, and the second gasket substrate 3 is formed with a second outer projection 3B surrounding the second inner projection 3A and projecting toward the cylinder block 13.

The first and the second outer projection 2B, 3B are also formed symmetrically to each other with respect to a mating surface between the both gasket substrates 2, 3, whereby when the both gasket substrates 2, 3 are disposed in overlapping relationship, a clearance or an air gap 15 (see FIG. 4) can be defined between the first and the second outer projection 2B, 3B which project in opposite directions.

Figure 4:
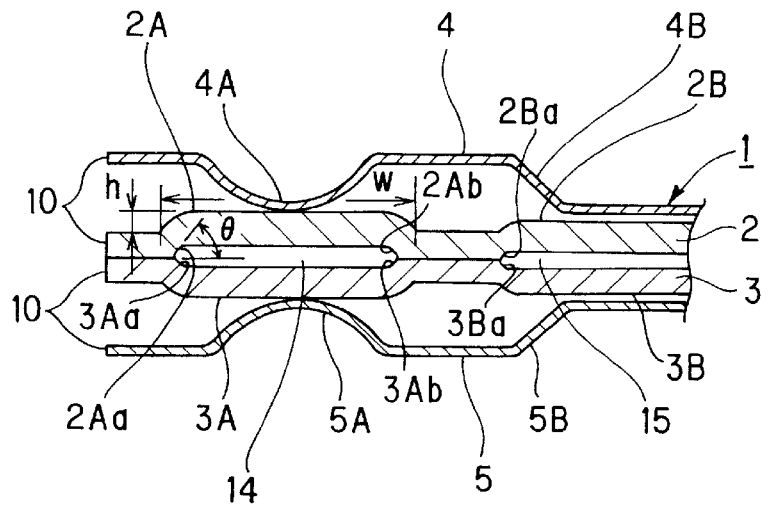
FIG. 4, is an enlarged cross section of part shown in FIG. 3.

The opposing surfaces of the first and the second inner projection 2A, 3A are formed as annular grooves which surround the combustion chamber opening 10 and which define the air gap 14 As shown to an enlarged scale in FIG. 4, each of these annular grooves is formed with a sidewall 2Aa, or 3Aa which is located on the inner periphery or toward the combustion chamber opening 10 and another sidewall 2Ab or 3Ab on the outer periphery.

By contrast, the opposing surfaces of the first and the second outer projection 2B, 3B are not formed as annular grooves but are formed as recesses. In other words, the both outer projections 2B, 3B are formed with sidewalls 2Ba, 3Ba toward the combustion chamber opening 10 so as to surround it, but are not provided with sidewalls on the other side.

As a consequence, as considered in a region located between a pair of adjacent combustion chamber openings 10, the air gap 15 will be formed between the sidewalls 2Ba, 3Ba which are adjacent to each other, as shown in FIG. 3, but the inner surfaces of the both outer projections 2B, 3B which are formed as recesses will contact each other in regions other than the region between the pair of adjacent combustion chamber openings 10. Thus it will be seen that the air gap 15 is formed in an extent lying between the sidewalls 2Ba, 3Ba to an area of contact between the both recessed surfaces.

On the other hand, the first plate 4 is formed with a first full bead 4A, which surrounds the combustion chamber opening 10 and a first half bead 4B which surrounds the first full bead 4A, the first full bead 4A being formed to project toward the first inner projection 2A of the first gasket substrate 2 and the first half bead 4B being formed to project toward the first outer projection 2B of the first gasket substrate 2.

Similarly, the second plate 5 is formed with a second full bead 5A which surrounds the combustion chamber opening 10 and a second half bead 5B which surrounds the second full bead 5A, the second full bead 5A being formed to project toward the second inner projection 3A of the second gasket substrate 3 and the second half bead 5B being formed to project toward the second outer projection 3B of the second gasket substrate 3. It will be noted that the full beads 4A, 5A and the half beads 4B, 5B are formed to define a surface symmetry.

In the embodiment shown, the cylinder block 13 is provided with a liner 16, as shown in FIGS. 2 and 3, and the liner 16 is formed with a flange 16A at its top end which extends radially outward. The liner 16 is secured as a press fit in the cylinder block 13, and the bottom surface of the flange 16A is disposed in abutment against the upper surface of an offset step 13A formed in the cylinder block 13, thereby positioning the liner 16 on the cylinder block 13.

The first inner projection 2A of the first gasket substrate 2, the second inner projection 3A of the second gasket substrate 3, the first full bead 4A of the first plate 4 and the second full bead 5A of the second plate 5 are placed as an overlapping assembly on top of the flange 16A of the liner 16.

On the other hand, the first outer projection 2B of the first gasket substrate 3, the second outer projection 3B of the second gasket substrate 3, the first half bead 4B of the first plate 4 and the second half bead 5B of the second plate 5 are placed, as an overlapping assembly, on top of the cylinder block 13 on the outer side of the flange 16A Under this condition, the cylinder head gasket 1 is held between the cylinder head and the cylinder block 13 by the clamping bolts mentioned above.

With the described construction, the cylinder head gasket 1 is interposed between the cylinder head and the cylinder block 13 of an engine, and is sealed therebetween by integrally fastening the cylinder head and the cylinder block 13 by clamping bolts. At this time, the first inner projection 2A of the first gasket plate 2 and the second inner projection 3A of the second gasket plate 3 undergo a plastic deformation toward the air gap 14 under the influence of the surface pressure, and the first outer projection 2B of the first gasket substrate 2 and the second outer projection 3B of the second gasket substrate 3 also undergo a plastic deformation toward the air gap 15.

Figure 5:
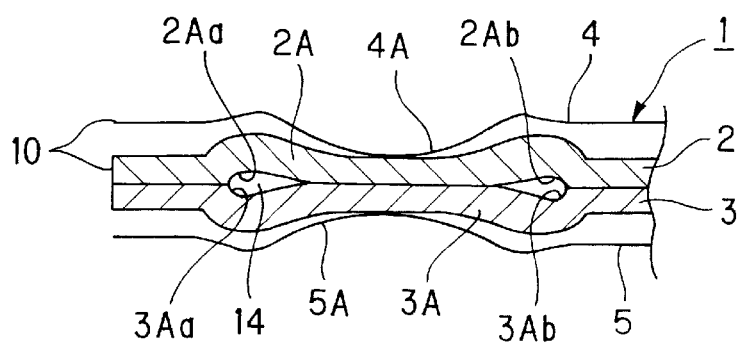
FIG. 5 is an enlarged section illustrating a plastic deformation of an increased magnitude of a first inner projection 2A and a second inner projection 3A.
Figure 6:
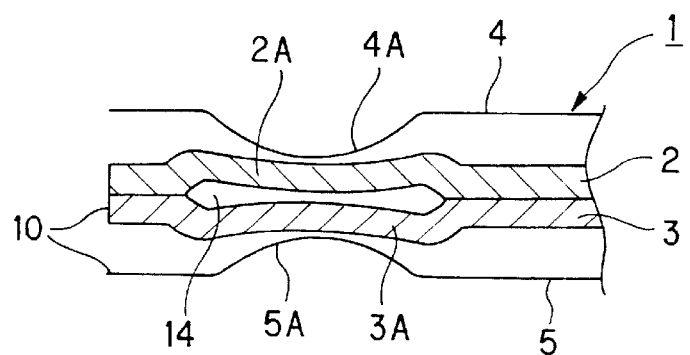
FIG. 6 is an enlarged cross section illustrating a plastic deformation of a reduced magnitude of the first inner projection 2A and the second inner projection 3A.

In the event the liner 16 projects slightly above the cylinder block 13 to increase the surface pressure in such region, the first inner projection 2A and the second inner projection 3A will experience an increased magnitude of plastic deformation toward the air gap 14 under the influence of the surface pressure, as illustrated in FIG. 5. By contrast, when the liner 16 is slightly recessed from the cylinder block 13 to reduce the surface pressure in such area, the first inner projection 2A and the second inner projection 3A will experience a slight magnitude of plastic deformation toward the air gap 14 under the influence of the surface pressure, as illustrated in FIG. 6. As a consequence, a surface pressure which is as even as possible can be obtained over the entire region of the four cylinder engine, thus preventing the occurrence of a blow-through of a combustion gas in a region of a reduced surface pressure.

It will be noted that considering a single liner 16, the surface pressure will be high at a position adjacent to the bolt hole 11, but will be low at a position which is removed from the bolt hole 11. However, the first inner projection 2A and the second inner projection 3A experience a magnitude of a plastic deformation in the circumferential direction of the combustion chamber opening 10 which varies depending on the magnitude of the surface pressure, whereby it is possible to maintain as even a surface pressure as possible in the circumferential direction of the combustion chamber opening 10.

At a position where the surface pressure is high, the first inner projection 2A and the second inner projection 3A will experience an increased magnitude of plastic deformation toward the air gap 14 under the influence of the surface pressure, as illustrated in FIG. 5, but it will be noted that regions close to the sidewalls 2A*a*, 2A*b*, 3A*a* and 3A*b* of the respective projections 2A, 3A are less susceptible to plastic deformation than the central regions, whereby these sidewall regions act as bead stops, thus preventing the respective full beads 4A, 5A from being excessively compressed and damaged. The same is true with the first outer projection 2B, the second outer projection 3B, the first half bead 4B and the second half bead 5B.

Figure 7:
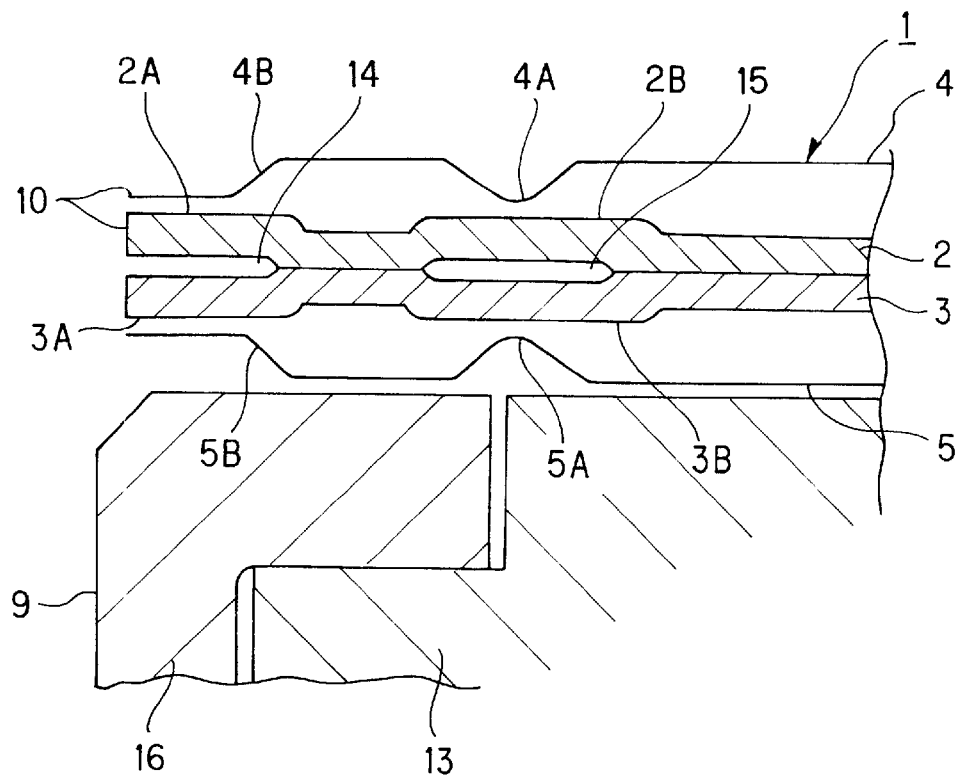
FIG. 7 is a cross section of a second embodiment of the invention.

FIG. 7 shows a second embodiment of the invention in which the inner projections 2A, 3A are left free without placing them in close contact toward the combustion chamber opening 10 while the outer projections 2B, 3B are formed with sidewalls on both the inner and the outer periphery so that the outer projections are disposed in close contact with each other on the outside of the both sidewalls.

In addition, the full beads 4A, 5A and the half beads 4B, 5B are interchanged in position as compared with the first embodiment, with the half beads 4B, 5B being disposed in overlapping relationship with the corresponding inner projections 2A, 3A and the full beads 4A, 5A being disposed in overlapping relationship with the outer projections 2B, 3B.

It is also to be noted that the full beads 4A, 5A and the outer projections 2B, 3B are disposed nearer the combustion chamber opening 10 than in the first embodiment, whereby the inner periphery of the outer projections 2B, 3B is disposed in overlapping relationship with the liner 16 and the full beads 4A, 5A are disposed across the liner 16 and the cylinder block 13.

Figure 8:
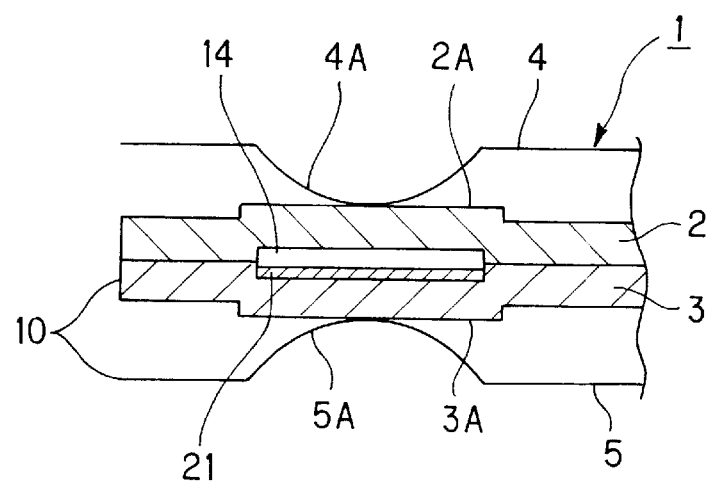
FIG. 8 is a cross section of a third embodiment of the invention.

FIG. 8 shows a third embodiment of the invention in which the first outer projection 2B of the first gasket substrate 3, the second outer projection 3B of the second gasket substrate 3, the first half bead 4B of the first plate 4 and second half bead 5B of the second plate 5 shown in the first embodiment are omitted.

On the other hand, a shim 21 is disposed within the air gap 14 in order to improve the sealing performance. It is preferred that the shim 21 be secured to at least one of the gasket substrates 2 and 3 for handling reasons, and may be secured to the second gasket substrate 3 by spot welding along the center line of the shim 21. The shim 21 has a thickness which is preferably equal to or less than one-half the height of the air gap 14 defined between the inner projections 2A and 3A.

As an alternative to providing the shim 21, a resin layer may be provided by a resin sheet which is adhesively bonded or by providing a resin coating. Preferably, the resin layer comprises polyamide or polyamideimide which exhibits high heat resistance, and which may be blended with a filler such as a graphite, carbon fiber, glass fiber or clay in order to improve the strength, the heat resistance and/or adhesion.

In place of the shim 21 or a resin layer, a scarfed layer may be provided. It should be understood that any one of shim 21, a resin layer or a scarfed layer may also be provided in the first or second embodiment.

Figure 9:
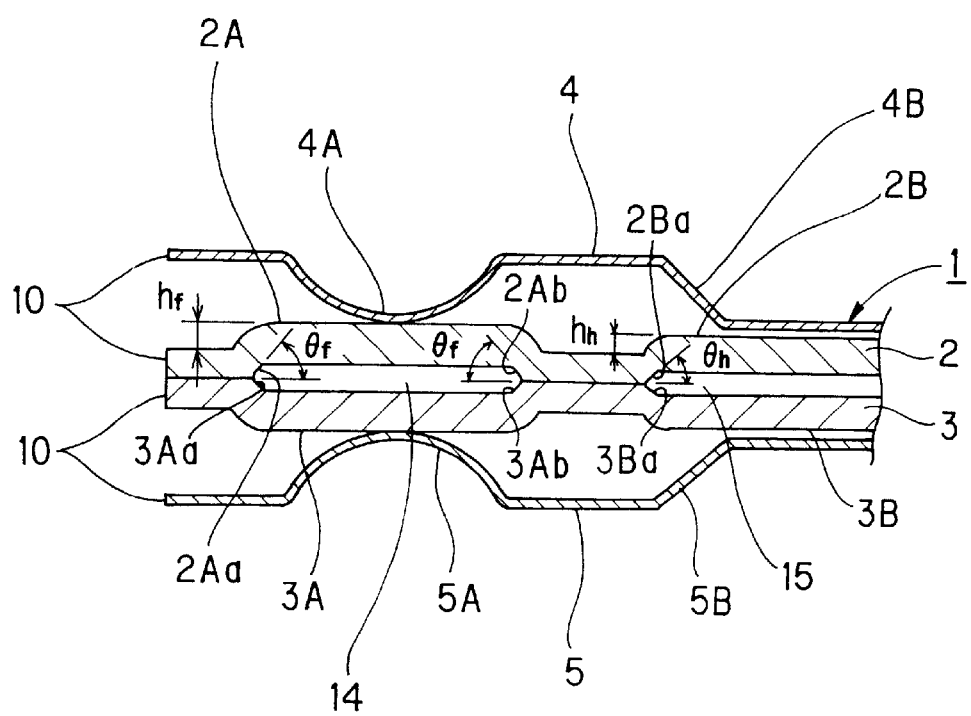
FIG. 9 is a cross section of a fourth embodiment of the invention.

FIG. 9 shows a fourth embodiment of the invention, which is fundamentally constructed in the similar manner as the first embodiment. However, in the present embodiment, in order to provide an optimized sealing performance, the strengths of the inner projections 2A, 3A disposed toward the full beads 4A, 5A are chosen to be greater than the strengths of the outer projections 2B, 3B disposed toward the half beads 4B, 5B.

More specifically, the amount of projection hf of each of the inner projections 2A, 3A is chosen to be larger than the amount of projection hh of the outer projections 2B, 3B. In addition or alternatively, an angle of rise θ f of each sidewall of the inner projections 2A, 3A may be chosen to be greater than an angle of rise θ h of each sidewall of the outer projections 2B, 3B.

When the strengths of the inner projections 2A, 3A disposed toward the full beads 4A, 5A are chosen to be greater than the strengths of the outer projections 2B, 3B disposed toward the half beads 4B, 5B, the surface pressure which is generated in the region of the full beads 4A, 5A during the clamping operation becomes greater than the surface pressure generated in the region of the half beads 4B, 5B, thus providing a more optimized sealing performance.

More specifically, a sealing force which is generally required for a half bead is on the order of 0.3 to 0.4 MPa, which is necessary in order to prevent an ingress of cooling water onto the end face of the liner and to prevent a gas which may leak from the full bead from becoming mixed into the cooling water. On the other hand, a sealing force which is required for a full bead is on the order of 6 to 9 MPa, which is necessary to seal against the explosion pressure of an engine. According to the type of the engine, a higher sealing force for a full bead will be required Thus, the sealing force required of the full bead is greater than the sealing force required of the half bead.

A clearance between the cylinder head and the cylinder block is designed to be narrow in a peripheral region and wider in a region adjacent to the bore. Accordingly, if the inner projections 2A, 3A has an offset height which is chosen to be the same as that the outer projections 2B, 3B, the surface pressure in the region of the outer projections 2B, 3B will be relatively higher, which is undesirable.

In addition, if the liner 16 lies depressed below the surface of the cylinder block 13, the surface pressure in the region of the outer projections 2B, 3B will be relatively higher, which is also undesirable. However, if the liner 16 projects above the surface of the cylinder block 13, the surface pressure in the region of the inner projections 2A, 3A will be relatively higher, which is desirable.

From these considerations, the sealing force of the outer projections 2B, 3B may be chosen such that the half beads are capable of sealing the cooling water when the liner 16 projects above the surface of the cylinder block 13.

In each embodiment described above, the first inner projection 2A and the second inner projection 3A have an identical cross section circumferentially of the combustion chamber opening 10, but their shapes may be changed depending on the location of the bolt holes 11 associated with clamping bolts so that a more even surface pressure prevails adjacent to and removed from the bolt holes 11.

More specifically, in the vicinity of the bolt hole 11, for example, in a region located within about 20° to 30° centered about a line joining the center of the combustion chamber opening 10 and the center of the bolt hole 1, the amount of projection h of each of the inner projections 2A, 3A, as illustrated in FIG. 4, may be reduced, its radial width w increased or an angle of rise θ of each sidewall reduced in comparison to a corresponding quantity at a position removed from the bolt hole 11. Obviously, these choices may be used in combination. Alternatively, rather than providing a surface pressure which is as even as possible in the circumferential direction, a design may be employed which provides a slightly higher surface pressure in the region adjacent to the combustion chamber opening 10.

Figure 10:
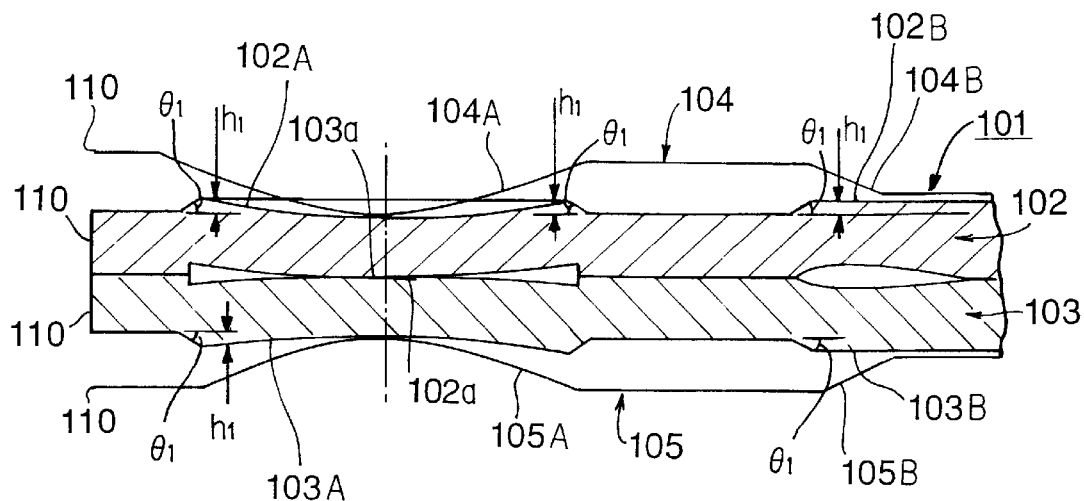
FIG. 10 is a cross section of a fifth, embodiment of the invention.

FIG. 10 shows a fifth embodiment of the invention, which is fundamentally constructed in the similar manner as the first embodiment.

In the present embodiment, an upper or a first gasket substrate 102 which is disposed toward a cylinder head, not shown, is formed with a first inner projection 102A surrounding a combustion chamber opening 110 and projecting toward the cylinder head and including a radially central part 102a projecting downward or toward a cylinder block, not shown, presenting an arcuate configuration in section. On the other hand, a lower or a second gasket substrate 103 disposed toward the cylinder block is formed with a second inner projection 103A surrounding the combustion chamber opening 110 and projecting downward and including a radially central part 103a which is arcuate in section and projecting upward or toward the cylinder block.

The first inner projection 102A and the second inner projection 103A are formed symmetrically to each other with respect to a mating surface between the both gasket substrates 102; 103, and when the both gasket substrates 102, 103, are disposed in overlapping relationship, the radially central part 102a of the first inner projection 102A and the radially central part 103a of the second inner projection 103A are disposed to be in close contact with each other continuously in the circumferential direction.

The first gasket substrate 103 is also formed with a first outer projection 102B surrounding the first inner projection 102A and projecting upward, and the second gasket substrate 103 is formed with a second outer projection 103B surrounding the second inner projection 103A and projecting downward.

The first outer projection 102B and the second outer projection 103B are also formed symmetrically to each other with respect to a mating surface between the both gasket substrates 102, 103, and when both gasket substrates 102, 103 are disposed in overlapping relationship, the first outer projection 102B and the second outer projection 103B which project in opposite directions are spaced from each other on their side located adjacent to the combustion chamber opening 110, but are disposed to be in close contact with each other at a position which is by a given distance removed on the opposite side or away from the combustion chamber opening 110.

Figure 11:
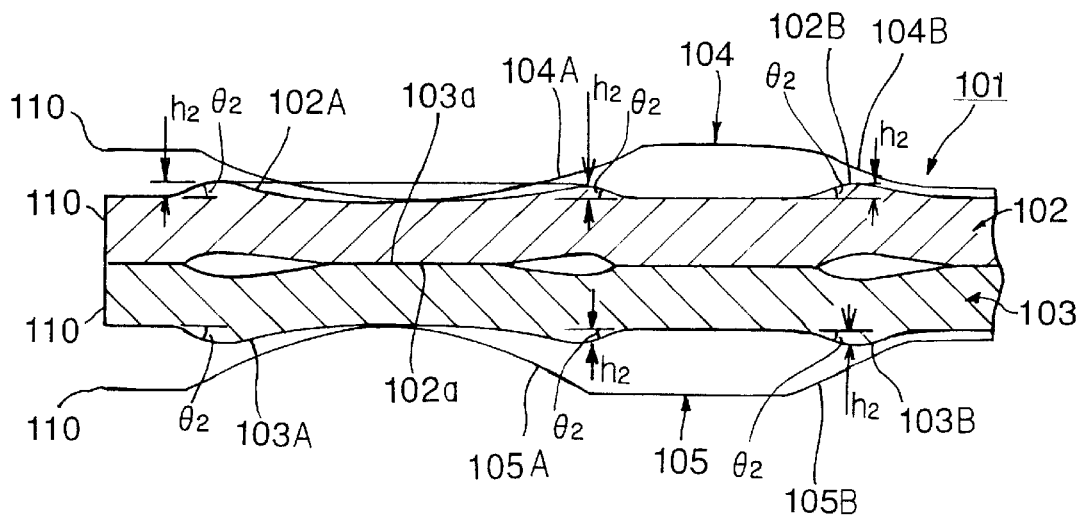
FIG. 11 is a cross section taken at a different position from FIG. 10.

It is to be noted that the first inner projection 102A and the second inner projection 103A have a height and an angle of rise along its inner and outer peripheries which vary in the circumferential direction. Specifically, FIG. 10 shows a cross section at an intermediate position between bolt holes through which the clamping bolts are passed (see the location indicated by the line III—III shown in FIG. 1), and it will be seen that at this position, the first inner projection 102A and the second inner projection 103A have an increased height h1 along the inner and outer peripheries and have an increased angle of rise θ1 from the body of the gasket substrates 102, 103. By contrast, FIG. 11 shows a Corresponding cross section taken at a position which is close to a bolt hole through which a clamping bolt is Passed. At this position, the first projection 102A and the second inner projection 103A have a reduced height h2 and a reduced angle of rise θ2 along the inner and outer peripheries. The heights h1, h2 and angles θ1, θ2, prevail over a given extent centered about the intermediate position between the bolt holes and the position close to the bolt holes, with both the height and the angle smoothly changing from one of the values to the other.

A first plate 104 is formed with a first full bead 104A which surrounds the combustion chamber opening 110 and a first half bead 104B which surrounds the first full bead 104A, the first full bead 104A being formed to project toward the first inner projection 102A of the first gasket substrate 102 and the first half bead 104B being formed to project toward the first outer projection 102B of the first gasket substrate 102.

Similarly, a second plate 105 is formed with a second full bead 105A which surrounds the combustion chamber opening 110 and a second half bead 105B which surrounds the second full bead 105A, the second full bead 105A being formed to project toward the second inner projection 103A of the second gasket substrate 103 and the second half bead 105B being formed to project toward the second outer projection 103B of the second gasket substrate 103. It will be noted that these full beads 104A, 105A and the half beads 104B, 105B are formed to provide a surface symmetry.

With the described construction, the cylinder head gasket 101 is interposed between a cylinder head and a cylinder block of an engine, and is sealed therebetween by integrally fastening the cylinder head and the cylinder block by using clamping bolts.

As viewed in the circumferential direction of the combustion chamber opening 110, the surface pressure at a position close to the clamping bolt is increased and is reduced at a position removed therefrom. However, because the first inner projection 102A and the second inner projection 103A have a circumferentially varying height, as indicated at h1 and h2, and also a circumferentially varying angle of rise, as indicated at θ1, θ2, along the inner and outer peripheries thereof, the surface pressure applied to the first inner projection 102A and the second inner projection 103A can be made as even as possible when viewed in the circumferential direction of the combustion chamber opening 110.

When the engine is in operation, any combustion gas which tends to blow through a clearance between the first inner projection 102A and the second inner projection 103A to the exterior exhibits a pressure which urges the first inner projection 102A toward the cylinder head and which simultaneously urges the second inner projection 103A toward the cylinder block. The surface pressure acting between the first inner projection and the cylinder head then increases, thus improving the sealing performance of such region. Similarly, the surface pressure acting between the second inner projection and the cylinder block increases, also improving the sealing performance in such region. When the first inner projection 102A is pressed against the cylinder head and the second inner projection 103A is pressed against the cylinder block, reactions from these pressures force the radially center part 102a of the first inner projection 102A and the radially central part 103a of the second inner projection 103A into a more tight contact with each other, thus improving the sealing performance in such region.

In this manner, the first gasket substrate 102 and the second gasket substrate 103 are pressed against each other at the same time as they are pressed against the cylinder head and the cylinder block, respectively, under the pressure of the combustion gas, thus preventing a blow-through of the combustion gas more effectively than in the prior art.

It is to be noted that rather than providing a surface pressure which is made as even as possible in the circumferential direction, a slightly higher surface pressure may be established in the region adjacent to the combustion chamber opening 110.

A number of modifications which are mentioned above may also be applied to the present embodiment.

While the invention has been shown and described above in connection with several embodiments thereof, it should be understood that a number of changes, modifications and substitutions therein are possible by one skilled in the art from the above disclosure without departing from the spirit and the scope of the invention defined by the appended claims.

What is claimed is:

1. A cylinder head gasket including first and second gasket substrates disposed in overlapping relationship, provided between a cylinder head and a cylinder block and having a combustion chamber opening formed therein in alignment with a cylinder bore, characterized in that:

the first gasket substrate is disposed toward the cylinder head and formed with a first inner projection surrounding the combustion chamber opening and projecting toward the cylinder head;

the second gasket substrate is disposed toward the cylinder block and formed with a second inner projection surrounding the combustion chamber opening and projecting toward the cylinder block;

a clearance is defined between the first and second inner projections;

a first plate having a combustion chamber opening aligned with the cylinder bore is disposed in overlapping relationship with the first gasket substrate and has a first bead formed thereon which surrounds the combustion chamber opening, said first bead projecting towards and being disposed in contact with the first inner projection;

a second plate having a combustion chamber opening aligned with the cylinder bore is disposed in overlapping relationship with the second gasket substrate and has a second bead formed thereon which surrounds the combustion chamber opening, said second bead projecting towards and being disposed in contact with the second inner projection;

and the first and second gasket substrates are compressed between the cylinder head and the cylinder block to cause plastic deformation of the first and second inner projections toward the clearance defined therebetween.

2. A cylinder head gasket including first and second gasket substrates disposed in overlapping relationship, provided between a cylinder head and a cylinder block and having a combustion chamber opening formed therein in alignment with a cylinder bore, characterized in that:

the first gasket substrate is disposed toward the cylinder head and formed with a first inner projection surrounding the combustion chamber opening and projecting toward the cylinder head and a first outer projection surrounding the first inner projection and projecting toward the cylinder head;

the second gasket substrate is disposed toward the cylinder block and formed with a second inner projection surrounding the combustion chamber opening and projecting toward the cylinder block and a second outer projection surrounding the second inner projection and projecting toward the cylinder block;

a clearance is defined between the first and second inner projections and a clearance is defined between the first and second outer projections;

a first plate having a combustion chamber opening aligned with the cylinder bore is disposed in overlapping relationship with the first gasket substrate and has a first full bead formed thereon which surrounds the combustion chamber opening and projects toward the first inner projection and a first half bead formed thereon which is disposed outside of the first full bead and projects toward the first outer projection;

a second plate having a combustion chamber opening aligned with the cylinder bore is disposed in overlapping relationship with the second gasket substrate and has a second full bead formed thereon which surrounds the combustion chamber opening and projects toward the second inner projection and a second half bead formed thereon which is disposed outside of the second full bead and projects toward the second outer projection;

and the first and second gasket substrates are compressed between the cylinder head and the cylinder block to cause plastic deformation of the first and second inner projections toward the clearance defined therebetween and of the first and second outer projections toward the clearance defined therebetween.

3. A cylinder head gasket according to claim 2, in which the amount of projection of the first and second inner projections is greater than the amount of projection of the first and second outer projections.

4. A cylinder head gasket according to claim 2, in which the first and second inner projections have an angle of rise from the associated gasket substrate greater than the angle of rise of the first and second outer projections from the gasket substrate.

5. A cylinder head gasket according to claim 2, in which a shim is provided on the inner surface of at least one of the first and the second inner projections.

6. A cylinder head gasket according to claim 2, in which a scarfed layer is formed on the inner surface of at least one of the first and the second inner projections.

7. A cylinder head gasket according to claim 2, in which a resin layer is formed on the inner surface of at least one of the first and the second inner projections.

8. A cylinder head gasket according to claim 2, in which the amount of projection of the first and the second inner projections is smaller in the vicinity of a clamping bolt which is used to clamp the cylinder head and the cylinder block than at a position removed from the clamping bolt.

9. A cylinder head gasket according to claim 2, in which the first and the second inner projection have a width which is wider in the vicinity of a clamping bolt which is used to clamp the cylinder head and the cylinder block together than at a position removed from the clamping bolt.

10. A cylinder head gasket according to claim 2, in which the first and the second inner projections have an angle of rise from the respective associated gasket substrate which is smaller in the vicinity of a clamping bolt which is used to clamp the cylinder head and the cylinder block together than at a position removed from the clamping bolt.

11. A cylinder head gasket including first and second gasket substrates disposed in overlapping relationship, provided between a cylinder head and a cylinder block and having a combustion chamber opening formed therein in alignment with a cylinder bore, characterized in that:

the first gasket substrate is disposed toward the cylinder head and formed with a first inner projection surrounding the combustion chamber opening and projecting toward the cylinder head and a first outer projection surrounding the first inner projection and projecting toward the cylinder head;

the second gasket substrate is disposed toward the cylinder block and formed with a second inner projection surrounding the combustion chamber opening and projecting toward the cylinder block and a second outer projection surrounding the second inner projection and projecting toward the cylinder block;

a clearance is defined between the first and second inner projections and a clearance is defined between the first and second outer projections, the sealing strength of the inner projections being greater than the sealing strength of the outer projections;

a first plate having a combustion chamber opening aligned with the cylinder bore is disposed in overlapping relationship with the first gasket substrate and has a first full bead formed thereon which surrounds the combustion chamber opening and projects toward the first inner projection and a first half bead formed thereon which is disposed outside of the first full bead and projects toward the first outer projection;

a second plate having a combustion chamber opening aligned with the cylinder bore is disposed in overlapping relationship with the second gasket substrate and has a second full bead formed thereon which surrounds the combustion chamber opening and projects toward the second inner projection and a second half bead formed thereon which is disposed outside of the second full bead and projects toward the second outer projection;

and the first and second gasket substrates are compressed between the cylinder head and the cylinder block to cause plastic deformation of the first and second inner projections toward the clearance defined therebetween.

12. A cylinder head gasket according to claim 11, in which the amount of projection of the first and second inner projections is greater than the amount of projection of the first and second outer projections.

13. A cylinder head gasket according to claim 11, in which the first and second inner projections have an angle of rise from the associated gasket substrate greater than the angle of rise of the first and second outer projections from the gasket substrate.

14. A cylinder head gasket according to claim 11, in which a shim is provided on the inner surface of at least one of the first and the second inner projections.

15. A cylinder head gasket according to claim 11, in which a scarfed layer is formed on the inner surface of at least one of the first and the second inner projections.

16. A cylinder head gasket according to claim 11, in which a resin layer is formed on the inner surface of at least one of the first and the second inner projections.

17. A cylinder head gasket according to claim 11, in which the amount of projection of the first and the second inner projections is smaller in the vicinity of a clamping bolt which is used to clamp the cylinder head and the cylinder block than at a position removed from the clamping bolt.

18. A cylinder head gasket according to claim 11, in which the first and the second inner projection have a width which is wider in the vicinity of a clamping bolt which is used to clamp the cylinder head and the cylinder block together than at a position removed from the clamping bolt.

19. A cylinder head gasket according to claim 11, in which the first and the second inner projections have an angle of rise from the respective associated gasket substrate which is smaller in the vicinity of a clamping bolt which is used to clamp the cylinder head and the cylinder block together than at a position removed from the clamping bolt.

20. A cylinder head gasket comprising:

first and second gasket substrates disposed in overlapping relation with one another between a cylinder head and a cylinder block and defining therein respective combustion chamber openings aligned with a cylinder bore, said first gasket substrate being disposed adjacent the cylinder head and defining therein a first projection disposed in surrounding relation with the respective combustion chamber opening and projecting toward the cylinder head, said second gasket substrate being disposed adjacent the cylinder block and defining therein a second projection surrounding the respective combustion chamber opening and projecting toward the cylinder block, said first and second projections being disposed in opposed relation with one another and defining a clearance therebetween, said first and second projections are plastically deformed towards one another into said clearance when said gasket is compressed between the cylinder head and the cylinder block;

a first plate disposed in overlapping relation with said first gasket substrate and defining therein a combustion chamber opening aligned with the cylinder bore, said first plate defining therein a first bead disposed in surrounding relation with the respective combustion chamber opening, said first bead being disposed in aligned relation with and projecting towards said first projection; and a second plate disposed in overlapping relation with said second gasket substrate and defining therein a combustion chamber opening aligned with the cylinder bore, said second plate defining therein a second bead disposed in surrounding relation with the respective combustion chamber opening, said second bead being disposed in aligned relation with and projecting towards said second projection.

* * * * *